(12) United States Patent
Weir et al.

(10) Patent No.: US 7,507,900 B2
(45) Date of Patent: Mar. 24, 2009

(54) METHOD AND APPARATUS FOR PLAYING IN SYNCHRONISM WITH A DVD AN AUTOMATED MUSICAL INSTRUMENT

(75) Inventors: Andrew P. Weir, Malvern, PA (US);
Joseph T. Friel, Ardmore, PA (US);
Guido Van den Berghe, Aartselaar (BE)

(73) Assignee: QRS Music Technologies, Inc., Naples, FL (US)

(\*) Notice: Subject to any disclaimer, the term of this patent is extended or adjusted under 35 U.S.C. 154(b) by 48 days.

(21) Appl. No.: 11/469,797

(22) Filed: Sep. 1, 2006

(65) Prior Publication Data

US 2007/0051228 A1 Mar. 8, 2007

Related U.S. Application Data

(60) Provisional application No. 60/713,936, filed on Sep. 2, 2005.

(51) Int. Cl.
*G10H 1/36* (2006.01)
*G06F 1/04* (2006.01)

(52) U.S. Cl. .................... 84/610; 713/500

(58) Field of Classification Search .............. 84/609, 84/610, 645; 434/307 A; 713/400, 500, 713/502
See application file for complete search history.

(56) References Cited

U.S. PATENT DOCUMENTS

| | | | |
|---|---|---|---|
| 5,062,097 A * | 10/1991 | Kumaoka | 369/70 |
| 5,138,925 A | 8/1992 | Koguchi et al. | |
| 5,148,419 A | 9/1992 | Koguchi | |
| 5,189,237 A | 2/1993 | Koguchi | |
| 5,300,725 A | 4/1994 | Manabe | |
| 5,313,011 A | 5/1994 | Koguchi | |
| 5,602,356 A * | 2/1997 | Mohrbacher | 84/609 |
| 6,600,097 B2 | 7/2003 | Shiiya | |
| 6,737,571 B2 | 5/2004 | Furukawa | |
| 2002/0092411 A1 | 7/2002 | Shiiya | |
| 2003/0177890 A1* | 9/2003 | Furukawa | 84/610 |
| 2004/0093448 A1* | 5/2004 | Wu et al. | 710/72 |
| 2006/0273936 A1* | 12/2006 | Matsuoka et al. | 341/50 |

\* cited by examiner

*Primary Examiner*—Walter Benson
*Assistant Examiner*—Andrew R Millikin
(74) *Attorney, Agent, or Firm*—Barnes & Thornburg LLP; Glenn W. Ohlson

(57) ABSTRACT

The invention disclosed herein is a system and method for playing music sequences, such as MIDI files in synchronization with a DVD. This system utilizes a preauthored music sequence and a controller that listens to the S/PDIF output of a DVD player. Further, this application discloses a method for creating MIDI files for use with the invention disclosed herein.

21 Claims, 6 Drawing Sheets

Sync-Along Device Operation Flow

METHOD AND APPARATUS FOR PLAYING IN SYNCHRONISM WITH A DVD AN AUTOMATED MUSICAL INSTRUMENT

RELATED APPLICATIONS

This application claims priority to U.S. Provisional application 60/713,936, which is incorporated herein by reference.

FIELD OF THE INVENTION

This invention relates to the area of automated musical instruments, particularly pianos. The invention also relates to the method of creating or authoring MIDI files for use with the automated musical instrument.

BACKGROUND OF THE INVENTION

Automated musical instruments, such as pianos, are well known in the art. Such instruments utilize a controller to deliver music sequences or articulation events to mechanical actuators, which then act to move keys or strike strings to produce available music. There have been a number of attempts to have an automated instrument play in synchronization or accompaniment with a prerecorded CD or hard drive. Such attempts are described in U.S. Pat. Nos. 5,138,925, 5,300,725, 5,148,419 and 5,313,011. The assignee of the present invention developed and markets under the name Pianomation, a number of automated acoustic piano systems and electronic devices, generally known as a controller, to drive them. Over time, the media from which the controller sourced its music sequences has expanded from authored Audio CDs to floppy discs, ISO-9660 CD and DVD drives, Compact Flash and Secure Digital cards. One skilled in the art will recognize that there are many ways to deliver the music sequences, such as MIDI files, to the customer and ultimately to the controller of the automated musical instrument.

In the Assignee's early products for playing the automated piano in synchronism with a CD, the CD media contained music sequences that were pre-synchronized to a digital accompaniment music track encoded as linear PCM. Several products currently on the market have the capability to synchronize music sequences, such as MIDI sequences, to commercial CD releases for the purpose of synchronizing the automated acoustic piano with the commercial CD audio performance. It became desirable, then, to synchronize the automated piano to a DVD audio/video performance as well. However, as one skilled in the art is aware, the data structure of a commercial CD and a DVD are not the same.

The following terms and definitions are used in this specification. The definitions included herein are to add meaning to terms and are not meant to limit or otherwise supplant meanings that are understood by those skilled in the art.

MIDI—Acronym for Musical Instrument Digital Interface. MIDI is a music industry standard for digitally communicating musical instrument articulation events as a sequence of one or more bytes per event. The standard includes mechanical, electrical and byte signaling specifications.

MIDI Interface—A physical interface across which MIDI bytes are sent and/or received.

MIDI Event—A byte sequence that encodes a single musical instrument articulation event such as 'key on' or 'sustain pedal depressed.'

MIDI Sequence—A chronological sequence of time-stamped MIDI events that encapsulates a performance of one or more musical instruments.

MIDI Sequencer—A device that plays a MIDI Sequence in real time for the purpose of reproducing a musical performance.

Standard MIDI File (SMF)—A music industry standard for storing and retrieving MIDI Sequences to and from a digital data file commonly referred to as MIDI file.

Pianomation—A system for translating MIDI events to electro-mechanical activity for the purpose of automating an acoustic piano, or other automated musical instrument.

Controller—An electronic device used to drive Pianomation with music sequences, such as MIDI Events from various media.

DVD—Acronym for the consumer electronics Digital Video Disc standard and media.

DVD Player—A device that plays DVDs commonly a stand alone consumer electronics device.

DVD Player Subsystem—An electronic Subsystem used to playback DVDs such as an integrated DVD player ASIC related electronic components contained within a larger system such as a Pianomation Controller.

Music Sequence—A term used in this application to generically refer to a chronological sequence of time-stamped digital musical instrument articulation events that encapsulates a performance of one or more musical instruments. This could be a SMF, a MIDI Sequence, or an otherwise encoded sequence that achieves the same objective.

Sync-Along DVD (SAD)—The technique described herein for synchronizing a music sequence to a DVD Player or DVD Player Subsystem.

Sync-Along DVD Device (SADD)—The device that implements the SAD technique. This device can either attach to or be contained within a Controller.

AC-3—The Dolby Labs standard for compressing and encoding one to six channels of digital audio at a sample rate of 48 kHz. Audio on Region-1 (and other) DVDs is encoded as AC-3.

S/PDIF—Acronym for Sony/Panasonic Digital Interface Format. S/PDIF is an electronics industry standard that originally specified a physical and digital communication protocol for passing linear digital audio over a coaxial cable. The standard was expanded to allow the delivery of AC-3 and other compressed audio packets.

S/PDIF Listening Device—A term used by this document to refer to a S/PDIF receiver with intelligence to parse, qualify and time the received S/PDIF data stream.

AC-3 Stream—A time-sequential flow of AC-3 packets, either on a S/PDIF data link or on DVD media.

DTS—A standard more recent that AC-3 that is also used for DVD compressed, multi-channel audio encoding.

MPEG-2—A term used by this document and other literature to refer to MPEG-1 Layer-2 compressed, multi-channel audio encoding.

PCM—Acronym for Pulse Code Modulation. This term refers to the linear digital encoding of instantaneous audio amplitude at a constant sample rate. This is also referred to as uncompressed digital audio.

Wad—a file that contains information needed to synchronize the musical instrument to the DVD. The wad contains:
  a MIDI sequence for each song of the DVD. This is in the form of a type-0 Standard MIDI file.
  The AC-3 start signatures for each song on the DVD. The signature is simply a short, generally 12 to 32 bytes, byte sequence that is unique to each song across all of the AC-3 on the DVD.

a signature index indicating the AC-3 packet to which each signature belongs.

DVD title text and song name text for each song on the DVD. The title text is used to associate the wad with a DVD. This text is displayed as the user dials through wad files on the user interface. The song name text is displayed when a song's signature is recognized and the MIDI sequence for that song begins playback.

Header information indicating the size of the wad, the number of songs contained, and the signature length used for the wad.

In the assignee's prior CD implementations, the controller, through use of a CD drive and subsystem incorporated into the controller, acts as both the MIDI Sequencer and the CD playback device, so the controller has inherent and immediate knowledge of what CD audio track is being played and what that track's time progress is.

For DVD system described herein, the DVD Player or DVD Player Subsystem is electronically and logically independent from the controller, thus the controller does not issue commands to the DVD player. Because of this independence, the controller must derive some way of remotely knowing what audio performance selection is currently being played by the DVD Player or player subsystem and what the time progress is within the DVD audio performance in order for it to properly and accurately synchronize a Music Sequence to it. It does this by monitoring an output of the DVD player.

SUMMARY OF THE INVENTION

The system of the invention includes a DVD player, a controller for receiving an output from the DVD player, playing a MIDI file and outputting the MIDI instructions to an automated musical instrument or other device to play the MIDI file, and an automated musical instrument or MIDI player. One skilled in the art will recognize that the controller, with the proper software and hardware, can also act as a MIDI player.

One skilled in the art will recognize that commercial DVD players have a S/PDIF output over which either 2-channel linear PCM or AC-3 data is transmitted during DVD playback. FIG. 1 shows the timing relationship between an analog or linear PCM signal or data stream and the AC-3 data provided on a S/PDIF channel. The top signal in FIG. 1 is a representation of an arbitrary analog audio signal 10. One skilled in the art will recognize that the signal represented could also be a continuous digital signal, such as a PCM signal, although such a signal would appear to have a ragged or stair step appearance. However, such a PCM signal would be continuous, and not in packets as with the AC-3 signal. The middle signal is a representation of an S/PDIF stream 15 having AC 3 data packets 16a and b, as would be found on the S/PDIF output of a DVD player. The bottom signal is a representation of a MIDI sequence 19 to be synchronized and shows the relationship of the signature and a MIDI sequence to the S/PDIF stream time. The dots represent an articulation or MIDI Event.

The output data generated on the DVD S/PDIF outputs is fixed at 48-thousand stereo sample frames per second. When this interface is outputting 2-channel PCM, the data stream represents a continuous 2-channel linear PCM stream that is synchronized to the video and analog audio that is being output by the same player. When this interface is outputting AC-3 data packets, as shown in FIG. 1, the output rate remains at 48-thousand stereo sample frames per second, but 16-bit AC-3 data words take the place of the linear PCM samples. One skilled in the art will recognize that the output rate is somewhat arbitrary, and other sampling rates can be used.

Since it is compressed, even 6-channel AC-3 takes less bits to encode that its stereo, linear PCM counterpart. Therefore, when AC-3 packets 16 are sent out the S/PDIF interface, there are unused sample slots 18 in the S/PDIF stream 15 between AC-3 packets 16a and 16b that are filled in with zeros. As transmitted on the S/PDIF output, the beginning of each AC-3 data packet 16a and b is time-aligned with the linear audio that the packet represents once it is decoded. In other words, the AC-3 packet transmission is also synchronized to the analog audio, and hence the video, that is being output by the same DVD player.

The DVD Player's S/PDIF output is an output signal on the DVD player that can provide an accurate time reference relative to the DVD's audio stream. A microcomputer with an attached S/PDIF receiver (a S/PDIF Listening Device) could monitor the S/PDIF output and observe exact audio time progress relative to the start of an audio performance if it had some reference to the start of said audio performance.

On a given DVD Player that is playing a given DVD containing a plurality of audio and video performances, the beginning of each audio performance can be recognized by a unique 'signature' in the S/PDIF data sequence, where 'signature' denotes a data sequence of an arbitrary number of data words. Thus, during DVD playback, the S/PDIF Listening Device could monitor the S/PDIF output and determine when a particular audio performance starts by comparing the current output to stored known signatures and it could know how much time has elapsed since that start point by counting the number of 48 kHz audio frames received relative to the first word of the signature. Similarly, the invention described herein can be utilized with any other sample-rate-synchronous digital audio transmission or signal.

When a DVD player is playing AC-3 audio, either 2-channel or 6-channel (5.1), as is most common, it can allow two options for its S/PDIF output: 'Raw' or 'PCM.' When outputting 'PCM,' the data appearing on the S/PDIF output is a continuous, stereo PCM stream that represents a 2-channel 'downmixed' version of the 6-channel AC-3 in the case of AC-3 6-channel, or the directly decoded AC-3 in the case of AC-3 2-channel. In the case of AC-3 6-channel, the downmix implementation can differ across players by at least one bit on any given sample. Additionally, some DVD Players will add stereo post-processing to the resulting 2-channel PCM in order to add 'spatial' or other psycho-acoustic effects. Therefore, if the 'PCM' option is selected for the S/PDIF output type, the exact 'PCM' output of a given DVD Player cannot be anticipated by pre-reading the DVD media in question.

Alternatively, when outputting 'Raw' (often referred to as 'Bitstream'), the data appearing on the S/PDIF output are the AC-3 packets exactly as they appear on the DVD media. Therefore, the signature packets could be known by simply directly reading the appropriate sections of the DVD to be played. A S/PFID Listening Device could thus know what audio performance signatures to expect from a DVD Player's 'Raw' S/PDIF output for a given DVD if the designer were to pre-read the DVD media and store the signature values in some form of memory accessible by the S/PDIF Listening Device.

There is an additional benefit to 'Raw' S/PDIF mode. When a S/PDIF interface outputs raw AC-3 (or other compressed audio formats) directly represented in FIG. 1, each AC-3 packet 16a and 16b is preceded by a header 20a and 20b (or data synchronization sequence) that is composed of 6 16-bit words of fixed values. These AC-3 headers 20a and 20b occur at regular intervals of 1536 sample frames. Further-more, when the player is paused or stopped, it switches to PCM mode and outputs a PCM stream of zeros, or, less commonly, it outputs no data. Either way, a S/PDIF Listening Device can know when a DVD Player is actually playing and when it is paused, stopped or navigating by synchronizing to the AC-3 headers and noting when that synchronization is lost (and regained).

For the above noted reasons, then, the 'Raw' S/PDIF output of AC-3 or other compressed audio formats is the preferred listening method for SAD. The technique could be implemented on a S/PDIF PCM output stream, either derived from a compressed format or passed directly from a DVD's PCM audio stream (the latter is very uncommon), with a few inconveniences such as not knowing when the user is navigating away from an active audio sequence, or not being able to accurately predict the signatures by reading the DVD directly.

Using the preferred listening techniques utilizing the 'Raw' S/PDIF output described above, a S/PDIF Listening Device can therefore know the exact start of audio performances and the exact audio time progress of those audio performances on a given DVD. The controller of the present invention (SADD) is just this type of S/PDIF Listening Device with the addition of a MIDI Sequencer.

DETAILED DESCRIPTION OF THE PREFERRED EMBODIMENT

Figure 1:
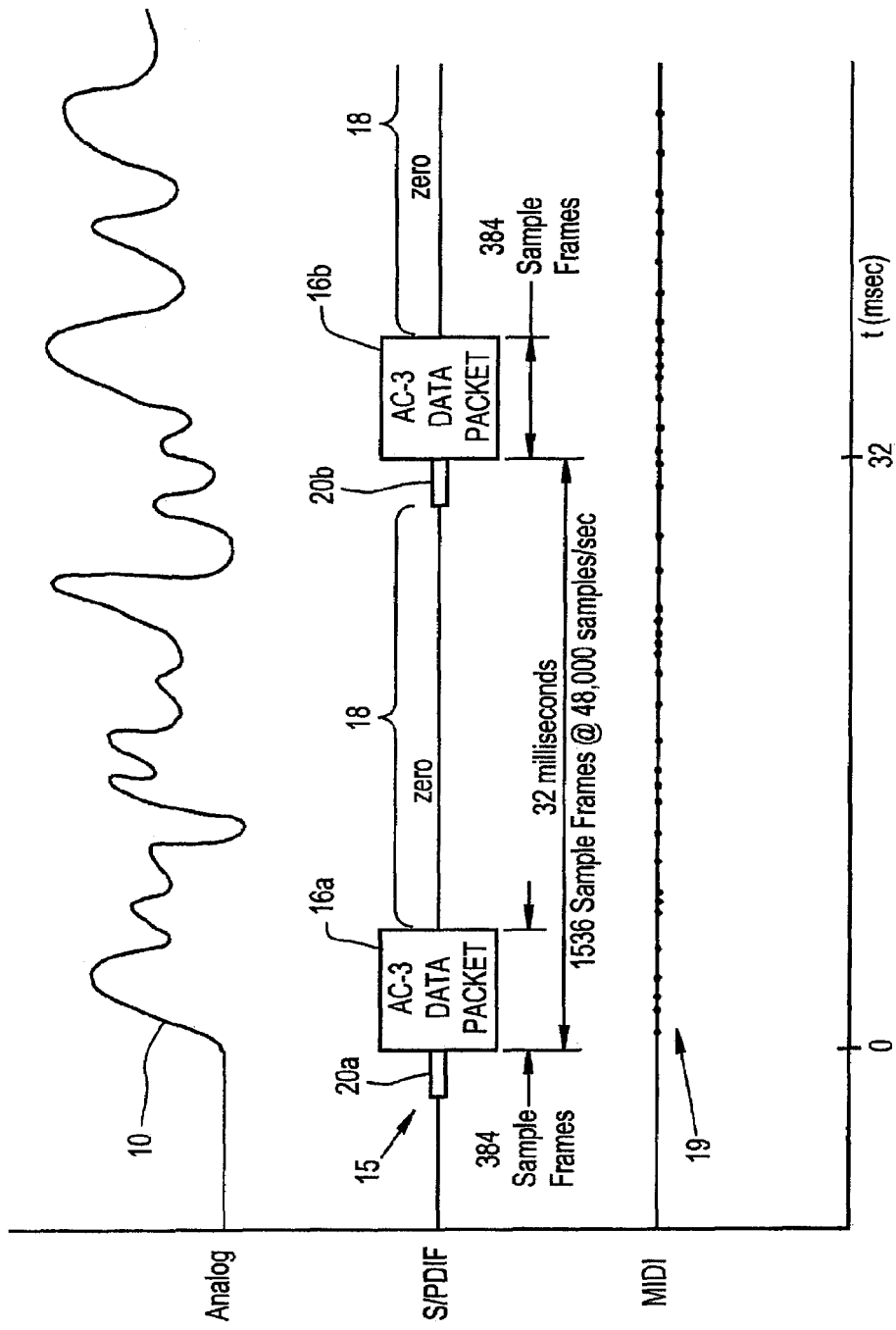
FIG. 1 is a diagram showing the relationship between the linear audio and an AC-3 data stream and MIDI sequence versus time.
Figure 2:
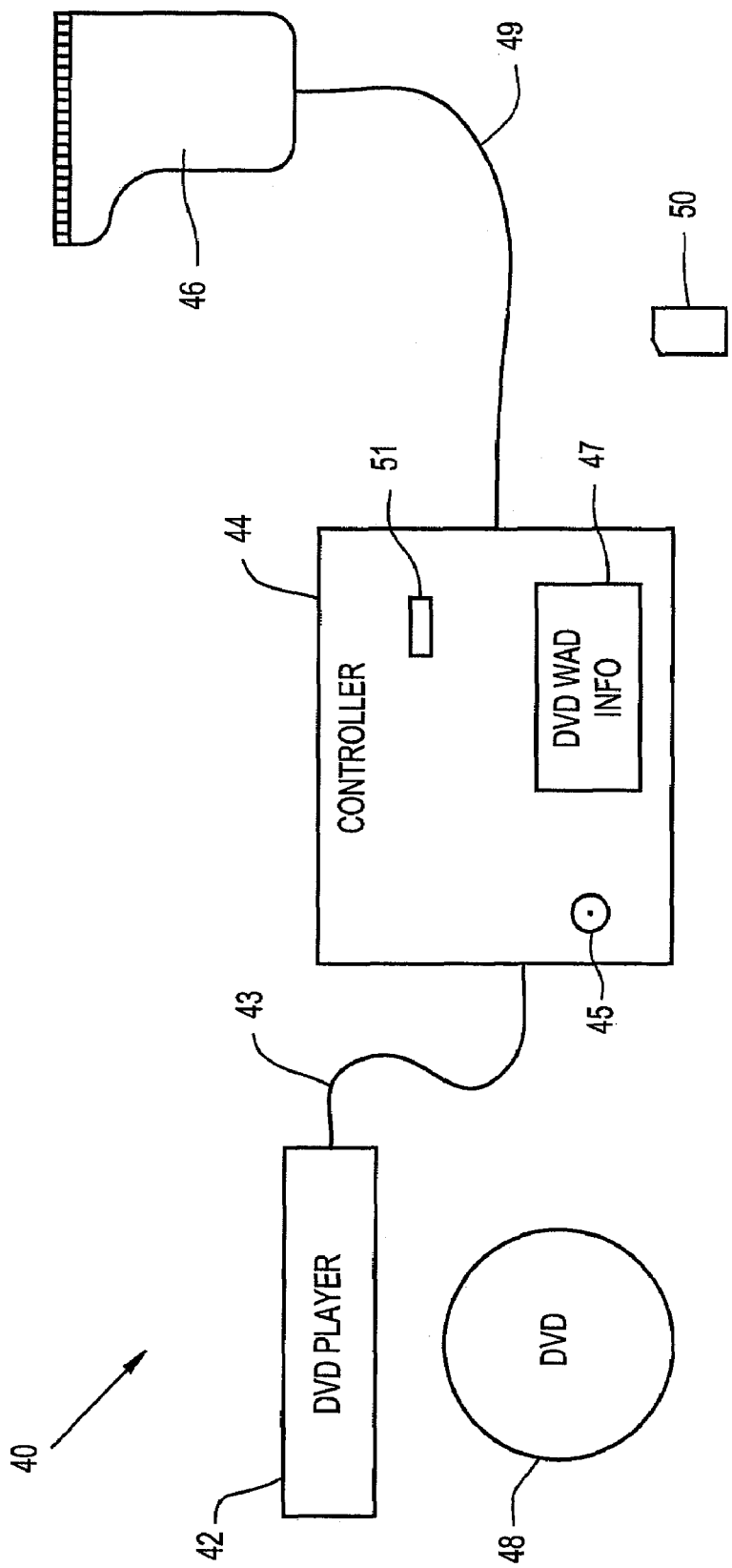
FIG. 2 is a block diagram showing the operational components of the system of the invention.

As shown in FIG. 2, the synchronization system 40 described herein includes a DVD Player 42, or DVD subsystem, a controller 44 or SADD, an automated musical instrument 46 such as a piano, a DVD 48, and a source of MIDI files, typically flash media or other memory devices such as an SD card 50 to provide instructions to the controller 44 drive the automated musical instrument 46. The DVD Player 42 is in communication with the controller 44 by a communication channel 43. Similarly, the controller 44 is in communication with the musical instrument 46 by a communication channel 49. One skilled in the art will recognize that the automated musical instrument 46 could be replaced by a MIDI player running on a computer via a media player, or by a MIDI player running on the controller with the provision of appropriate software. In such an alternate embodiment, the computer or controller 44 would have appropriate outputs to drive speakers or headphones.

Figure 3:
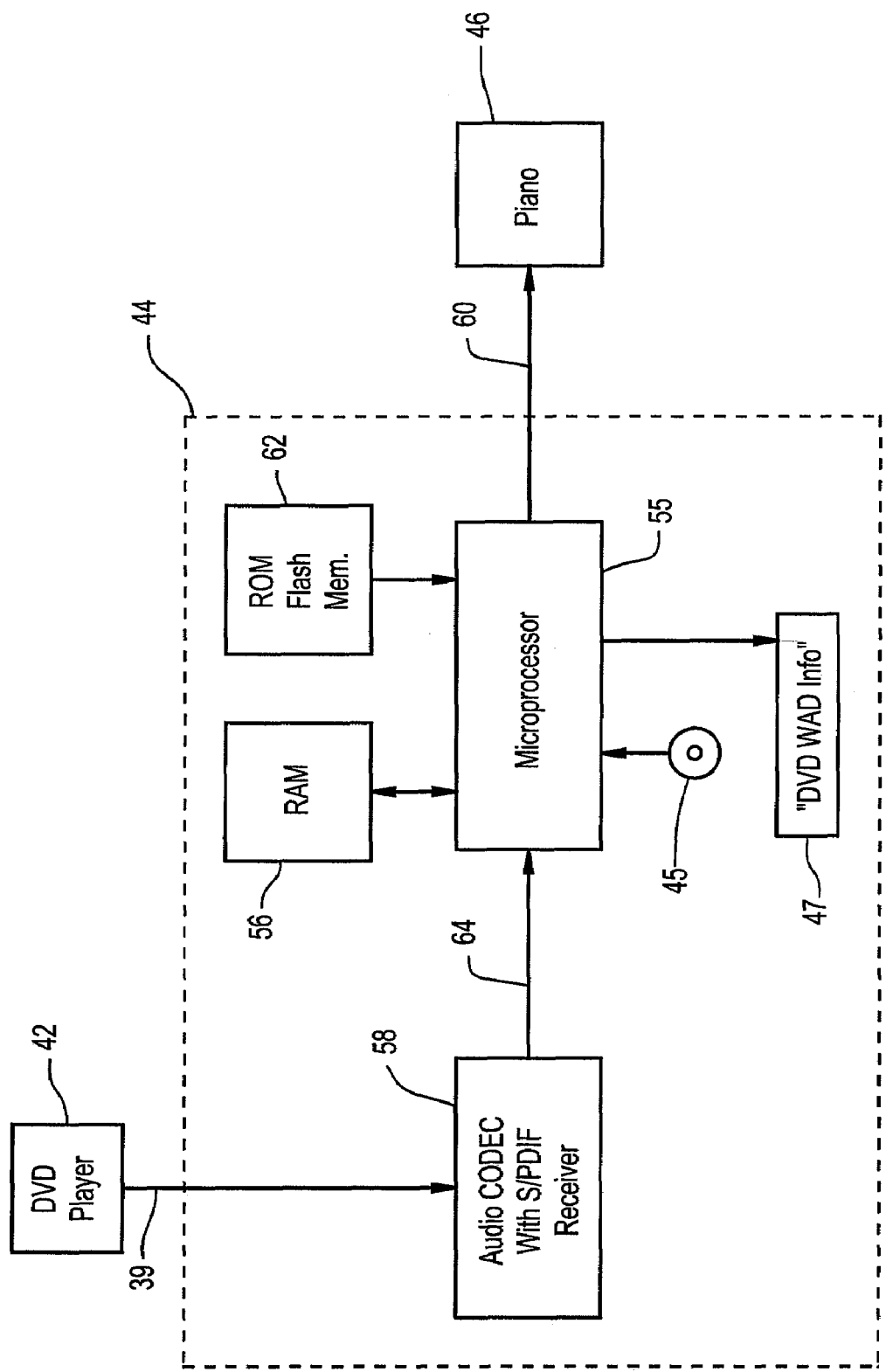
FIG. 3 is a block diagram showing the operational components of the controller.

In the preferred embodiment as shown in FIG. 3, the controller 44 or SADD includes a microprocessor 55 in communication with RAM 56, a S/PDIF receiver 58, and a MIDI output 60 for outputting instructions to a MIDI device, such as musical instrument 46. The communication channel 64 between the microprocessor 55 and the S/PDIF receiver 58 is preferably a high speed serial link. Similarly, the MIDI output 60 to the musical instrument 46 is a UART serial channel. The S/PDIF receiver 58 receives the S/PDIF signal from the S/PDIF output of the DVD player 45 by communication channel 39.

In the preferred embodiment, the microprocessor 55 is a Blackfin ADSP-BF532 or equivalent, made by Analog Devices. The Blackfin includes a built in UART for transmitting the MIDI data on the MIDI output 60.

In the preferred embodiment, the S/PDIF receiver 13 is part of an Audio CODEC chip, made by Cirrus Logic, Model CS42516, which includes an audio analog to digital converter, a digital to analog converter, a bi-directional communications channel to the microprocessor 55. All of the features of the CODEC chip need not be used to utilize the S/PDIF receiver functionality.

The controller 44 is also in communication with flash or read-only memory 62 which contains microcomputer boot data and the Wads, including AC-3 signatures with their associated MIDI Sequences. In alternate embodiments, the controller is in communications with removable media such as SD card 50 or compact flash cards to provide boot data and AC-3 signatures. The Wads may be stored in any location and media, so long as the microprocessor 55 has access to them.

In operation, the microprocessor 55 is instructed to load in to ram 56 the Wad for a particular DVD 48, the Wad including the signature and MIDI Sequence data associated with a particular DVD 48 before said DVD 48 is actually played. The Wad information is retrieved from accessible to the microprocessor 55, such as read only memory 62 or other media, such as SD card 50. The selection is typically done by the user manipulating an input device such as a control knob 45 on the controller 44. The Wads available are displayed on a display 47, and the user manipulates the control knob 45 by rotating the knob to scroll through the display, until the desired DVD information corresponding to the particular DVD 48 is displayed. The information displayed generally relates to the identity of the DVD such as its title, or song titles available for play, but can also include any other information in the Wad.

Once the display 47 shows the DVD information for the DVD 48 the user desires to play, the user pushes the control knob 45 to indicate to the controller 44 that the displayed selection should be played. The user starts play of the DVD 48 on the DVD player 42, and the controller 44 monitors the S/PDIF output from the DVD player 42 and monitors for AC-3 header synchronization. Once synchronized, the controller 44 parses the starting words of each raw AC-3 packet being presented and compares the words to each of the plurality of multi-word AC-3 signatures, corresponding to the plurality of songs on the DVD, looking for a match When one of the plurality of these signatures is recognized, the controller 44 marks the current S/PDIF sample time as time-0 and loads the MIDI Sequence corresponding to the recognized signature. The controller 44, referencing the signature index on the Wad, determines the AC-3 packet the signature came from to determine how much time has passed since the start of the song to time 0. For example, if the signature is from the $12^{th}$ AC-3 packet, the controller 44 can determine that 384 milliseconds (12*32 milliseconds) have passed since the start of play of the DVD. The controller 44 then starts play of the MIDI sequence at a point in the sequence that accounts for passage of the time from the start of play. Should any articulation events occur prior to the recognition of the signature, the events are simply ignored. This start point in the MIDI sequence would account for the time it took to get to the recognized signature, in the example 384 milliseconds, plus the amount of time that has passed since time 0, which should be quite small given a fast enough processor. It then plays the MIDI Sequence out the MIDI output 60 against time-0 in synchronization with the S/PDIF sample frame time where every two 16-bit words received at the S/PDIF input represent $1/48000$th of a second in real time.

In the current embodiment, the controller 44 monitors the S/PDIF sample time by capturing the S/PDIF data through a high-speed serial interface 64 via DMA and monitoring the DMA progress via a combination of periodic DMA interrupts and DMA progress register reads. Using this DMA monitoring, the SADD MIDI Sequencer can achieve a MIDI Event presentation time as accurate as $1/48000$th of a second.

The invention described herein compares the DVD 48 being played to DVD signatures stored in the read only memory 62 accessed by the controller 44. The process of creating the signatures, or preauthoring, is also important to the preferred implementation. The current preauthoring process requires reading the DVD directly and extracting the audio performances. It is preferable to separate the individual audio performances by reading the DVD on chapter boundaries as these boundaries tend to be the natural boundaries between audio performances on the types of DVDs that are the normal candidates for this process.

As one skilled in the art will recognize, a DVD can have multiple audio tracks. If the DVD's default audio track selection is a compressed format, then that default audio track is the one that is extracted. Otherwise, a non-default, compressed format is selected. The compressed formats that can be encountered are the various AC-3 formats already discussed, the DTS format, and the MPEG-2 format. MPEG-2 is the compressed format used by European DVDs—Region 2 and other. If a DVD 48 contains no compressed audio tracks, it is not considered for authoring.

Figure 4:
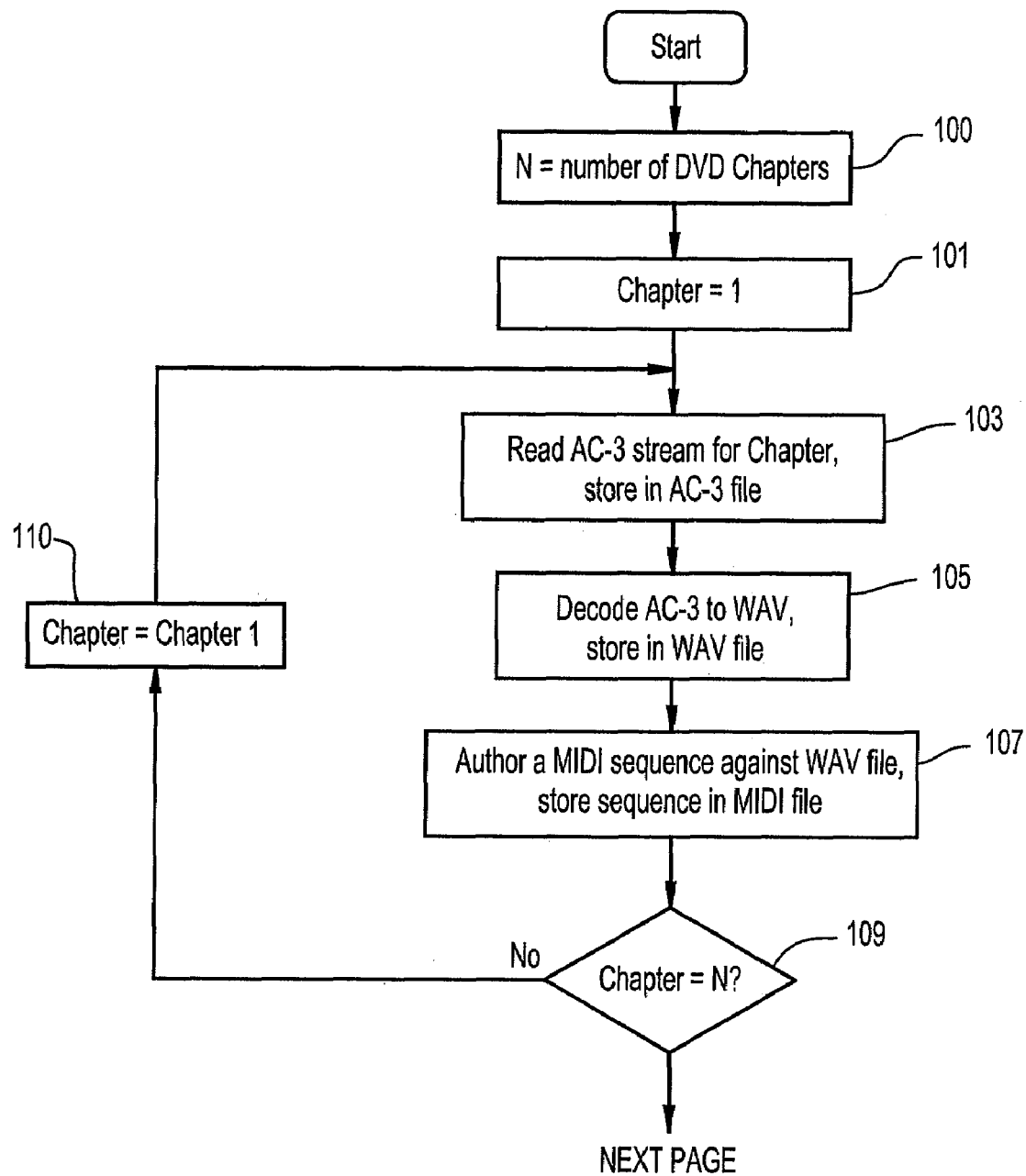
FIG. 4 is a flow chart showing the operational flow of the controller of the invention.
Figure 5:
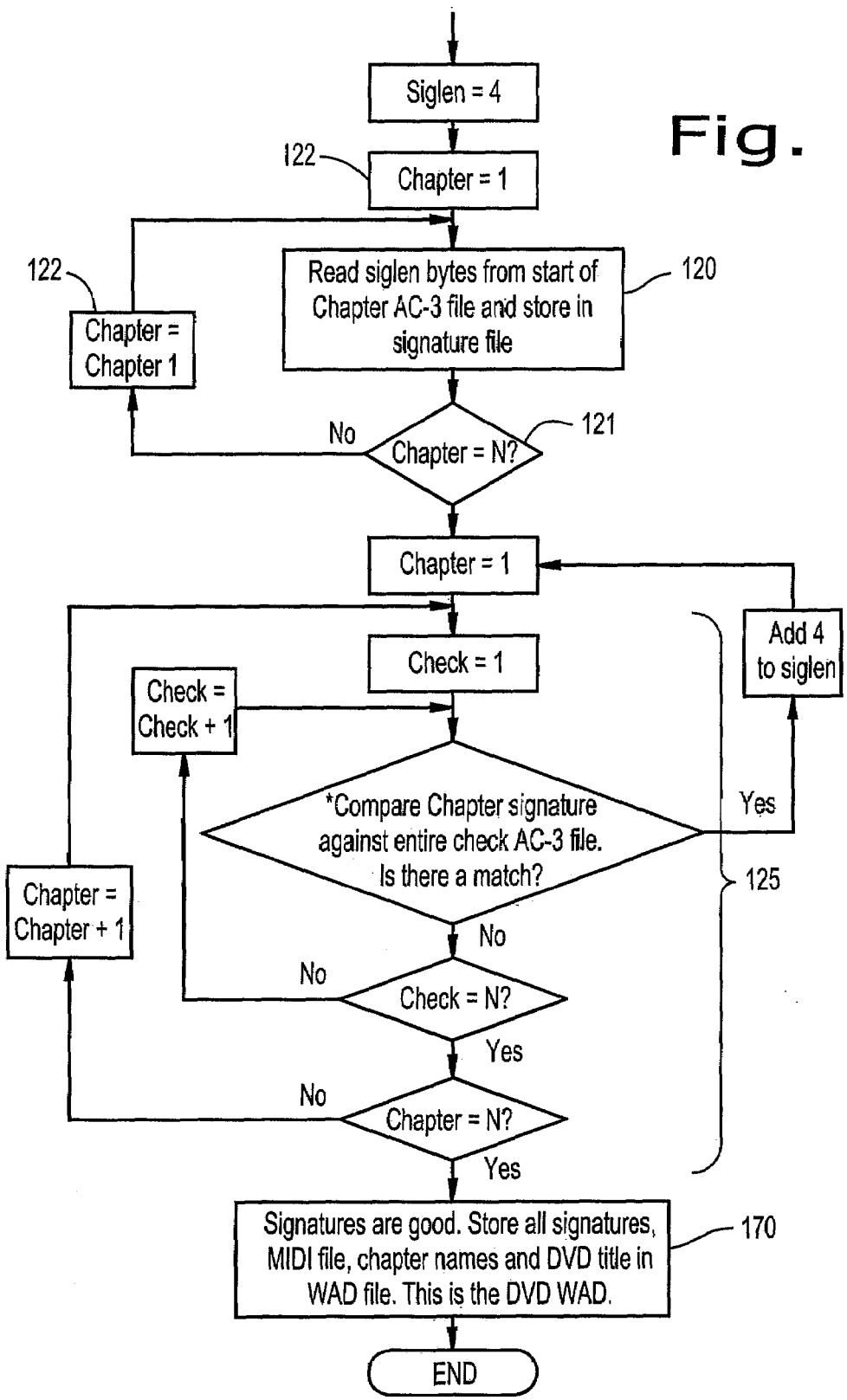
FIG. 5 is a flow chart showing the preauthoring sequence.

In the preauthoring process of the invention, as outlined in the flowchart in FIGS. 4 and 5, each audio performance is extracted to a separate file. For instance, if a DVD 48 has 10 performances, or chapters, each performance is stored as a separate file. In the preauthoring process, the number of DVD performances is determined and stored 100. A performance counter is set to 1 101. For a particular performance or chapter the next step is to read the AC-3 stream for the performance, and store the AC-3 stream in a file 103. The AC-3 file is then decoded to a WAV format and stored in a WAV file 105.

Each of the compressed audio performances are decompressed to a linear, PCM file format such as WAV or AIFF at 48 kHz or another set sampling rate 105. This linear format represents each audio performance from the DVD 48 with the inherent timing of the DVD 48 built in to the file's sample rate. A music sequence, preferably a MIDI file, is then authored by an artist against each of these PCM files 107, using standard music sequence authoring tools (such as the program Digital Performer sold by Motu). The PCM file's sample rate is used as the clock by which the music sequence time is measured—instead of the system clock of the authoring computer. Therefore, the music sequence itself will be in absolute synchronization with the audio that is ultimately generated by the DVD player. This process is repeated for each performance and the performance counter incremented by 1, 109 until the total number of performances is reached 110.

The process of obtaining the signatures is outlined in FIG. 5. A signature, having an initial size or siglen of 4 bits, is taken from the beginning of the first compressed audio packet of each file 120. The process of obtaining the signatures is repeated for each performance by comparing the chapter counter 122 to the total number of chapters 121 and incrementing the chapter counter 122 if the total is not met. In the steps shown in 125, each signature is then compared to the first 12 bytes of all compressed audio packets 16 in all performances extracted from a particular DVD 48 in order to determine if the signature is truly unique among the other signatures for performances on the DVD 48. If it is determined that the signature is not unique, the process is repeated with an increased signature size, such as 12 bytes. Each time redundant signatures are encountered, the signature size is increased by four bytes until all signatures are found to be unique. Preferably, the signatures are from 12 to 20 bytes.

Finally, in step 170 the signatures and the music sequences, in SMF format, are wrapped up into a single binary file along with the DVD title and each audio performance's title and other meta information such as the DVD's signature length. This file, referred to as a SAD Wad or simply wad as defined earlier can be permanently installed into the controller's 44 read-only memory 62 or dynamically loaded from a removable medium, such as an SD or compact flash card 50. In such an implementation the controller 44 will include a suitable reader 51. The SAD Demo Device contains multiple SAD Wads in its in-system flash memory. It is intended that the controller 44 preload one particular SAD Wad and listen for only those signatures at any given time. This usage assumption allows the pre-authoring to only require signature uniqueness across a single DVD. These, the user must select.

Figure 6:
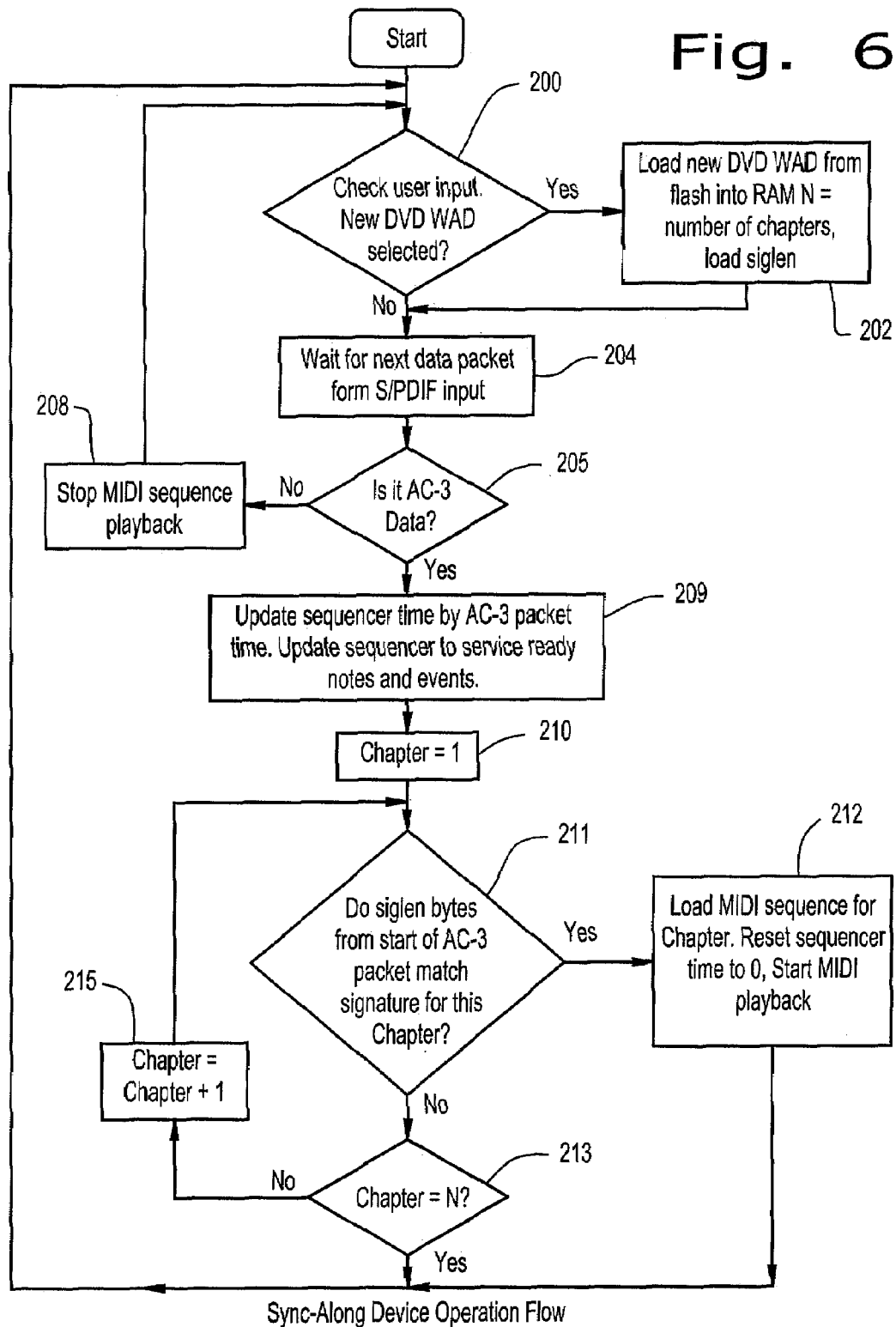
FIG. 6 is a flow chart showing the signature recognition and synchronization sequence.

As outlined in the flowchart that appears as FIG. 6 in this application, the synchronization system 40 begins by determining whether a user has selected a new DVD Wad 200. If it is determined the user has selected a new DVD Wad, the controller 48 loads a new DVD Wad from read only memory 62 into RAM 56. The number of chapters is set into a chapter counter and the signatures are loaded into RAM 56 202. Once step 202 is completed or if the check of user input indicates that a new DVD Wad has not been selected, the operation proceeds to the next step. In the next step 204 the controller 48 waits for and listens to the next data packet from the S-PDIF input from the S-PDIF receiver 58. The next step 205, the controller determines if the information received from the S-PDIF receiver 58 is AC-3 data. If it is not, MIDI sequence playback is stopped 208 and the process is returned to step 200. If an AC-3 data is detected, the process proceeds to the next step 209, MIDI sequencer time is updated by AC-3 packet time and the sequencer is updated to service ready notes and events. The process then proceeds to check the resident signatures for each chapter to determine if the AC-3 packet being sensed matches one of the signatures in the chapter. As set forth in step 210 the chapter search begins with chapter one. As noted in decision box 211, the process compares the signature for chapter one against the bytes from the AC-3 packet at the beginning of the performance. If the bytes match, the appropriate MIDI sequence for the chapter is loaded, the sequencer time is set to 0, and MIDI playback begins at 212. If the bytes do not match, the process determines if the total chapter has been reached by comparing the chapter number to the chapter counter 213, if it is not, the chapters are incremented by 1 214 and the steps outlines in 211 are repeated. Once the chapters reach the chapter counter number the process returns to step 200.

Note that the current implementation has thus far only implemented signatures on AC-3 compressed audio packets. However, the technique is directly applicable to DTS and MPEG-2 compressed audio packets. As far as the SAD implementation is concerned, the only difference between these formats is how far apart successive packets are spaced, in sample frames, on the S/PDIF interface. Again, the sample frame spacing of these packets indicates the exact uncompressed size of these packets. AC-3 packets are spaced by 1536 sample frames, DTS by 512 sample frames and MPEG-2 by 384 to 1152 sample frames. The SAD Wad format and the controller 44 firmware already allow for all three formats to be implemented by providing a per-DVD entry for the compressed audio packet sample frame spacing. The latter two formats have not yet been encountered simply because none of the pre-authored SAD Wads to data were derived from DVDs that did not have AC-3 as their default audio track. It is necessary, in fact, to support MPEG-2 in order to accommodate European DVDs since these do not all implement AC-3 as an option.

Similarly, DVDs or other media that only implement linear PCM are handled by setting their sample frame spacing to zero in the SAD Wad. This signals the controller 44 firmware not to attempt periodic header synchronization, but to continuously search for the signatures in the PCM stream instead. Thus, instead of synchronizing to AC-3 packet starts, the system would sync to every sample frame. The signature index in the Wad would reference a sample frame rather than an AC-3 packet to determine the location of the signature.

With the teachings herein, other modifications may be made without departing from the scope of the invention. Hence, the embodiments described herein are merely examples and are not meant to limit the scope of the invention.

The invention claimed is:

1. An apparatus for playing an automated musical instrument in synchronism with a performance on a DVD, the apparatus comprising:
    a DVD player for playing a DVD, the DVD player including a S/PDIF output for providing a S/PDIF data stream;
    a source of a music sequence;
    a controller for providing the music sequence to the automated musical instrument;
    the controller receiving the S/PDIF output and initiating play of the automated musical instrument at a predetermined time in relation to the S/PDIF data stream; and
    wherein the controller monitors the S/PDIF data stream, compares the data to known performances, and identifies the DVD performance being played by the DVD player.

2. The apparatus of claim 1, wherein the controller includes memory to store information identifying performances on a DVD.

3. An apparatus for playing an automated musical instrument in synchronism with a performance on a DVD, the apparatus comprising:
    a DVD player for playing a DVD, the DVD player including a S/PDIF output for providing a S/PDIF data stream;
    a source of a music sequence;
    a controller for providing the music sequence to the automated musical instrument;
    the controller receiving the S/PDIF output and initiating play of the automated musical instrument at a predetermined time in relation to the S/PDIF data stream; and
    wherein the controller includes memory, the memory storing signatures of performances.

4. The apparatus of claim 3, wherein the controller monitors the S/PDIF data stream, compares the data stream to the signatures in memory, and identifies the performance related to the data stream.

5. The apparatus of claim 4, wherein the signature is a number of sample frames from the beginning of a DVD performance.

6. The apparatus of claim 5, wherein the number of sample frames is at least 4 bytes.

7. The apparatus of claim 5, wherein the number of sample frames is between 4 and 20 bytes.

8. The apparatus of claim 3, wherein the controller monitors the S/PDIF data stream, compares a portion of the data stream to the signatures of performances, identifies the performance having a signature matching the data stream, and outputting the music sequence to the automated musical instrument for play in synchronization with the S/PDIF data stream.

9. An apparatus for playing an automated musical instrument in synchronism with a performance on a DVD, the apparatus comprising:
    a DVD player for playing a DVD, the DVD player including a S/PDIF output for providing a S/PDIF data stream;
    a source of a music sequence;
    a controller for providing the music sequence to the automated musical instrument;
    the controller receiving the S/PDIF output and initiating play of the automated musical instrument at a predetermined time in relation to the S/PDIF data stream; and
    the controller including an S/PDIF receiver for receiving S/PDIF audio data stream from the DVD player, a microprocessor for comparing the S/PDIF audio data stream to a signature of known DVD performance.

10. The apparatus of claim 9, wherein the signature is stored in flash memory accessible by the controller.

11. The apparatus of claim 10, wherein the signature is stored in removable media accessible by the controller.

12. An apparatus for playing an automated musical instrument in synchronism with a performance on a DVD, the apparatus comprising:
    a DVD player for playing a DVD, the DVD player including a S/PDIF output for providing a S/PDIF data stream;
    a source of a music sequence;
    a controller for providing the music sequence to the automated musical instrument;
    the controller receiving the S/PDIF output and initiating play of the automated musical instrument at a predetermined time in relation to the S/PDIF data stream; and
    wherein the controller is in communication with memory, the memory storing at least one DVD Wad.

13. The apparatus of claim 12, wherein the controller includes a display for displaying indicia identifying the DVD related to the at least one DVD Wad.

14. The apparatus of claim 13, wherein the controller includes a user input to allow a user to select a DVD Wad.

15. An apparatus for playing an automated musical instrument in synchronism with a performance on a digital media player, the apparatus including:
    providing a digital audio data stream, wherein the digital audio data stream has not been re-authored for synchronous control;
    a digital media player, the player providing a digital audio output for providing a digital audio data stream;
    a source of music sequence;
    a controller for providing the music sequence to the automated musical instrument;
    the controller receiving the digital audio output and initiating play of the automated musical instrument at a predetermined time in relation to the digital audio datastream; and
    wherein the controller monitors the digital audio data stream, compares the data to known performances, and identifies the performance being played by the digital media player.

16. The apparatus of claim 15, wherein the predetermined time is determined by monitoring a sample rate of the digital audio output.

17. The apparatus of claim 15, wherein the controller includes memory to store information identifying performances on a digital video media.

18. The apparatus of claim 17, wherein signatures of performances are stored on the memory.

19. The apparatus of claim 18, wherein the controller monitors the digital audio data stream, compares the data stream to the signatures in memory, and identifies the performance related to the data stream.

20. The apparatus of claim 19, wherein the signature is a number of sample frames from the beginning of a digital video media performance or a chapter of a digital video media performance.

21. The apparatus of claim 20, wherein the number of sample frames is between 4 and 20 bytes.

* * * * *